W. G. ABBOTT, Jr.
WELDING APPARATUS.
APPLICATION FILED FEB. 5, 1918.
1,311,789.
Patented July 29, 1919.
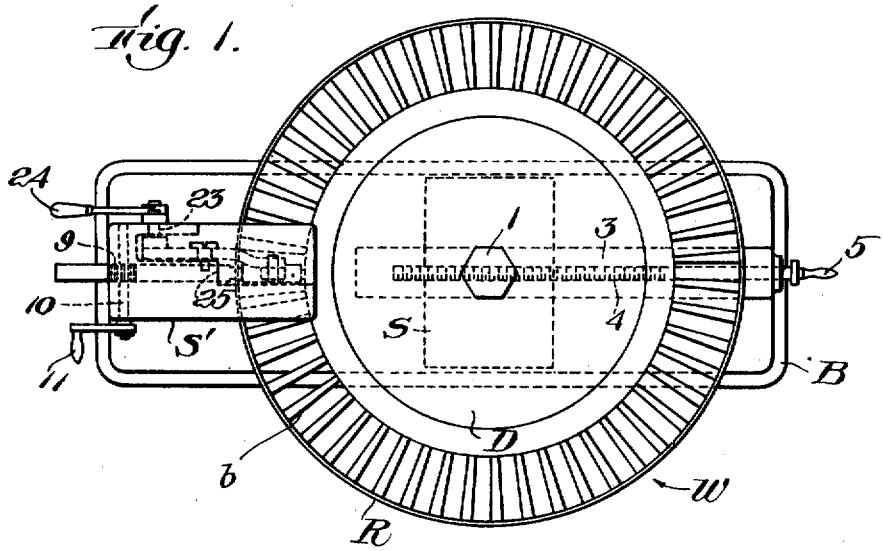
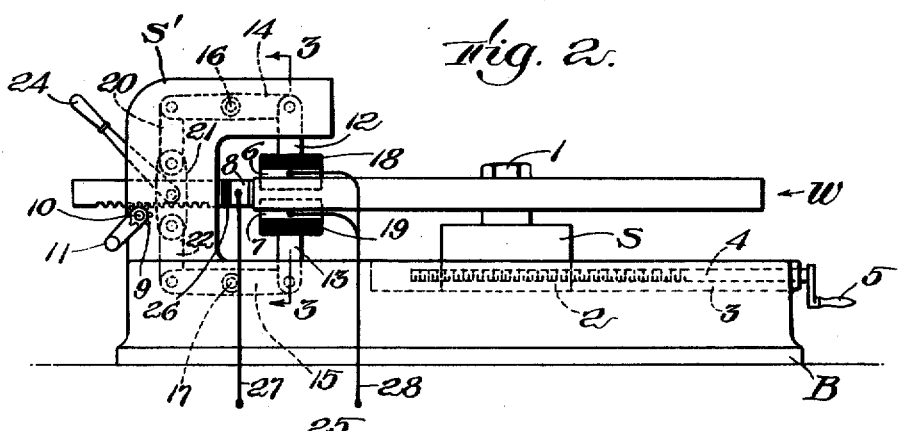
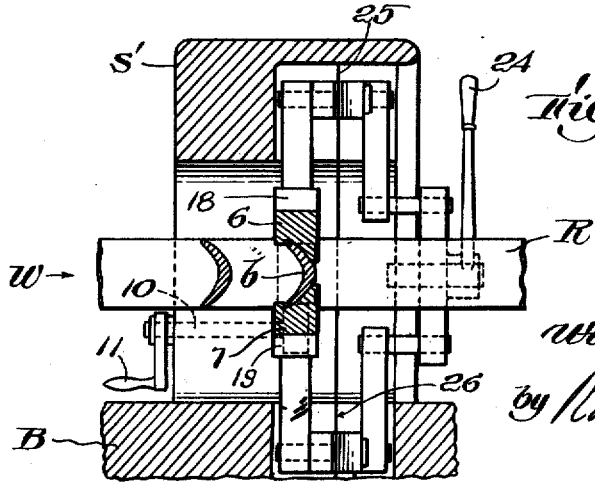
Inventor:
William G. Abbott, Jr.,
by Roberts, Roberts & Cushman
his Attorneys.

UNITED STATES PATENT OFFICE.

WILLIAM GEORGE ABBOTT, JR., OF WILTON, NEW HAMPSHIRE.

WELDING APPARATUS.

1,311,789. Specification of Letters Patent. Patented July 29, 1919.

Application filed February 5, 1918. Serial No. 215,438.

*To all whom it may concern:*

Be it known that I, WILLIAM G. ABBOTT, Jr., a citizen of the United States of America, and resident of Wilton, in the county of Hillsboro and State of New Hampshire, have invented new and useful Improvements in Welding Apparatus, of which the following is a specification.

This invention relates to apparatus for welding radial members into wheels and more particularly to apparatus for welding turbine blades to the shroud ring of a turbine wheel.

The usual method of welding turbine blades to the shroud ring of turbine wheels has been as follows: The blades are first secured to the hub or central disk of the wheel by welding or in other suitable manner. The shroud ring is then fitted over the outer ends of the blades in position to be welded to the blades. The terminals of a suitable source of electrical current are held against the hub or central disk and shroud ring respectively and current is transmitted between the terminals through the shroud ring, blades and hub, in series. The outer terminal is successively held against the shroud ring at the end of each blade for the purpose of welding a single blade at a time by causing the current to flow through a single blade at a time. However, instead of flowing through a single blade the current branches and flows through a plurality of blades in parallel. Moreover, after one or more blades have been welded they afford paths of lower resistance by virtue of their welded connections with the shroud ring and the current is shunted through the welded blades in large measure. Consequently much difficulty has been experienced and many defective turbine wheels have resulted.

It is the object of the present invention to provide apparatus for quickly and effectively welding turbine blades or the like to a shroud ring or the like, for preventing the current from being shunted through welded blades, and for overcoming other disadvantages of prior methods of welding turbine blades. Other objects of the invention are to provide apparatus in which the wheel can be rotated about its axis into position to weld the blades successively, in which the parts may be readily adjusted to wheels of different sizes, in which the blades are clamped between terminal means, in which both terminal means may be controlled from the same position, and in which either the ring terminal means or the wheel or both may be moved along the line of the blade to be welded.

Still further objects of the invention will be apparent from the following description and the accompanying drawings, in which—

Figure 1 is a top plan of one embodiment of my invention;

Fig. 2 is a side elevation of the same embodiment; and

Fig. 3 is a cross section on line 3—3 of Fig. 2.

The particular embodiment of my invention illustrated in the drawings comprises a base B having a wheel support S and a terminal support S' mounted thereon. The wheel support comprises a block having an upwardly projecting axle upon which the wheel W is mounted to rotate in a horizontal plane, a lock nut 1 being provided to hold the wheel on the axle. The supporting block S has a tongue 2 fitting in groove 3 in base B which serves to guide the block along the base. A screw 4 journaled in base B and threaded into tongue 2 serves to reciprocate the support S along the base when rotated by handle 5.

Two terminal means arranged to contact respectively with a blade of the turbine wheel and with the shroud ring are employed. The terminal means contacting with the blade comprises two opposed jaws 6 and 7 respectively, disposed above and below the turbine wheel and adapted to clamp a blade therebetween as shown in Fig. 3. The terminal means contacting with the shroud ring comprises an elongate electrode 8 reciprocatably mounted in support S' so as to be moved radially of the wheel into and out of contact with the shroud ring R, the forward end of the electrode 8 having a surface adapted to fit against the outer periphery of the shroud ring. In order to reciprocate the electrode 8 into and out of contact with the shroud ring a pinion 9 is provided in mesh with rack teeth on the lower side of the electrode. Pinion 9 is mounted on shaft 10 extending through support S' and a handle 11 is secured to the outer end of shaft 10 to actuate the pinion.

Jaws 6 and 7 are movably supported through the medium of rods 12 and 13 upon the forward ends of links 14 and 15 pivoted at 16 and 17 on support S' and base B respectively. The rear ends of the links 14 and 15 are joined together by three links 20, 21 and 22, which are pivotally connected together. The central link 21 is pivotally mounted at its central point on the support S' by means of a shaft 23, and a handle 24 is secured on the outer end of shaft 23 for rotating link 21. Thus, the links 20, 21 and 22 constitute a toggle which is adapted to move the jaws 6 and 7 into and out of contact with a blade $b$ of the turbine wheel when the link 21 is moved to and from dead center by handle 24. When the link 21 approaches the dead-center position shown in Fig. 2 the jaws 6 and 7 clamp the blade $b$ therebetween and when the link 21 reaches dead-center the jaws are locked in clamping position.

In order to accommodate the links controlling jaws 6 and 7 the support S' and base B are recessed as shown in full lines in Fig. 3 and in dotted lines in Fig. 1. The recesses are offset at 25 and 26 to form shoulders and the links 14 and 15 are bent over the shoulders so that the jaws 6 and 7 lie in the same radial plane as electrode 8 while the mechanism for actuating the jaws is disposed at one side of the electrode 8.

The forward terminal end of electrode 8 is preferably insulated from the rear end thereof by a block of insulation 26 and the jaws 6 and 7 are preferably insulated from rods 12 and 13 by similar blocks of insulation 18 and 19. The source of current (not shown) is then connected to the terminals through conductors 27 and 28.

In operation the turbine wheel, comprising the central disk D, blades $b$ already secured to the disk, and shroud ring R fitting over the outer ends of the blades, is mounted on support S. The support S is adjusted along the guideway 3 by means of handle 5 until the jaws 6 and 7 are opposed to the circular path of blades $b$. The wheel is rotated until a blade is disposed between the jaws 6 and 7, and the jaws are clamped to the blade by throwing handle 24 into the position shown in Fig. 2. The electrode 8 is then reciprocated into contact with the periphery of the shroud ring and current is transmitted through the conductor 27, electrode 8, shroud ring R, across the juncture between the ring and blade, through the blade $b$ to the jaws 6 and 7, and thence to conductor 28. Inasmuch as the terminals contact with the ring and blade immediately adjacent the juncture between the two parts the current is forced to flow directly across the juncture, thereby to weld the blade to the ring. After one blade is welded, the terminals are withdrawn and the wheel is rotated until the next blade is brought between the jaws, etc.

In the event that it becomes necessary or desirable to adjust the turbine wheel vertically this may be accomplished by inserting (or removing) washers under the wheel. In welding blades into a wheel having a plurality of rows of blades one or both of the electrodes may be curved or offset so as to extend between the blades of one row into contact with the blades of another row.

What I claim is:

1. Apparatus for welding radial members to the rim of a wheel comprising means for rotatably supporting the wheel to rotate about its axis, terminal means adapted to be moved transversely of the plane of rotation of the wheel into contact with a radial member, a terminal member arranged to contact with the rim at the end of the radial member, and means for producing relative movement between said wheel and terminal member along the line of said radial member.

2. Apparatus for welding turbine blades to the shroud ring of a turbine wheel comprising means for clamping a turbine blade, and means contacting with the shroud ring at the outer end of said blade, whereby current may be transmitted between said two means across the juncture between the blade and shroud ring.

3. Apparatus for welding turbine blades into turbine wheels comprising means for rotatably supporting a turbine wheel to rotate about its axis, a pair of terminal members disposed on opposite sides of the plane of rotation of the wheel, a pair of links pivotally mounted intermediate their ends on opposite sides of said plane to swing transversely of said plane, each link being connected to one of said terminal members at one end, and toggle mechanism connected between the opposite ends of said links for simultaneously clamping the terminal members against the opposite sides of a turbine blade so that current may be transmitted through the terminal members to the turbine blade and thence across the juncture between the turbine blade and the wheel.

4. Apparatus for welding turbine blades to the shroud ring of a turbine wheel comprising means for rotatably supporting a turbine wheel to rotate about its axis, terminal means adapted to be moved into and out of contact with a turbine blade, and terminal means arranged to be moved into and out of contact with the shroud ring near the outer end of said blade, whereby the turbine blades may be successively welded to the shroud ring by current transmitted through the said two terminal means across the juncture between the turbine blades and shroud ring.

5. Apparatus for welding turbine blades to the shroud ring of a turbine wheel comprising means for rotatably supporting a turbine wheel to rotate about its axis, a terminal adapted to be moved into and out of contact with a turbine blade, and a terminal arranged to be radially moved into and out of contact with the periphery of the shroud ring at the end of said blade, whereby the turbine blades may be successively welded to the shroud ring by current transmitted through the said two terminal means across the juncture between the turbine blades and shroud ring.

6. Apparatus for welding turbine blades to the shroud ring of a turbine wheel comprising means for rotatably supporting a turbine wheel to rotate about its axis, terminal means arranged to be moved transversely of the plane of rotation of the turbine wheel into contact with a turbine blade, terminal means arranged to be reciprocated along the radial line of said blade into contact with the periphery of the shroud ring at the end of said blade, and means for reciprocating said supporting means along said radial line.

7. Apparatus for welding turbine blades to the shroud ring of a turbine wheel comprising means for rotatably supporting a turbine wheel to rotate about its axis, terminal means arranged to be moved transversely of the plane of rotation of the turbine wheel into contact with a turbine blade, terminal means arranged to contact with the periphery of the shroud ring at the end of said blade, and means for reciprocating said supporting means along said radial line.

8. Apparatus for welding turbine blades to the shroud ring of a turbine wheel comprising a base for rotatably supporting a turbine wheel to rotate horizontally, a supporting arm extending upwardly from the base at one side of the turbine wheel, terminal means arranged to contact with a blade of the turbine wheel and with the shroud ring at the end of the blade respectively, and means mounted on said supporting arm for moving said terminal means into and out of contact with the turbine blade and shroud ring respectively.

Signed by me at Wilton, New Hampshire, this thirty-first day of January, 1918.

WILLIAM GEORGE ABBOTT, Jr.

Copies of this patent may be obtained for five cents each, by addressing the "Commissioner of Patents, Washington, D. C."